US008643947B2

(12) United States Patent
Nezu et al.

(10) Patent No.: US 8,643,947 B2
(45) Date of Patent: Feb. 4, 2014

(54) CONFOCAL MICROSCOPE SYSTEM

(75) Inventors: Taichirou Nezu, Musashino (JP); Takayuki Kei, Musashino (JP); Hideo Hirukawa, Musashino (JP); Yohei Kuwabara, Musashino (JP); Hironori Takai, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 377 days.

(21) Appl. No.: 13/038,834

(22) Filed: Mar. 2, 2011

(65) Prior Publication Data
US 2011/0216404 A1    Sep. 8, 2011

(30) Foreign Application Priority Data
Mar. 2, 2010 (JP) ................ 2010-045102

(51) Int. Cl.
*G02B 21/00* (2006.01)
(52) U.S. Cl.
USPC .......................................... 359/368
(58) Field of Classification Search
USPC ................................. 359/368–395
See application file for complete search history.

(56) References Cited

U.S. PATENT DOCUMENTS

| 5,717,519 A * | 2/1998 | Sugiyama et al. ............ 359/368 |
| 6,071,748 A * | 6/2000 | Modlin et al. ................. 436/174 |
| 2003/0234979 A1 * | 12/2003 | Poo et al. ....................... 359/393 |
| 2005/0002091 A1 | 1/2005 | Amano |
| 2006/0033988 A1 * | 2/2006 | Mikuriya et al. .............. 359/385 |
| 2006/0147176 A1 * | 7/2006 | Takamatsu et al. ........... 385/147 |
| 2009/0086316 A1 | 4/2009 | Kawahito |

FOREIGN PATENT DOCUMENTS

| EP | 1666947 A2 | 6/2006 |
| EP | 1804107 A1 | 7/2007 |
| EP | 1857853 A2 | 11/2007 |
| JP | 2004-212434 A | 7/2004 |
| JP | 2009-205083 A | 9/2009 |
| JP | 2009-288087 A | 12/2009 |

OTHER PUBLICATIONS

European Search Report dated May 20, 2011, issued in corresponding European Patent Application No. 11156287.2.

* cited by examiner

*Primary Examiner* — Alessandro Amari
(74) *Attorney, Agent, or Firm* — Westerman, Hattori, Daniels & Adrian, LLP

(57) ABSTRACT

There is provided a confocal microscope system configured so as to be compact in size without the needs for a large space, requiring fewer spots for adjustment. In the confocal microscope system, respective units making up the confocal microscope system are integrally housed in a protection cabinet covering the confocal microscope system, and when a specimen disposed opposite to an objective lens is moved toward an external face of the protection cabinet, a side of the external face, adjacent to an opening through which the specimen is taken in, or out, is defined as a front face, the Nipkow disk type scanner unit is disposed backward of the objective lens.

6 Claims, 9 Drawing Sheets

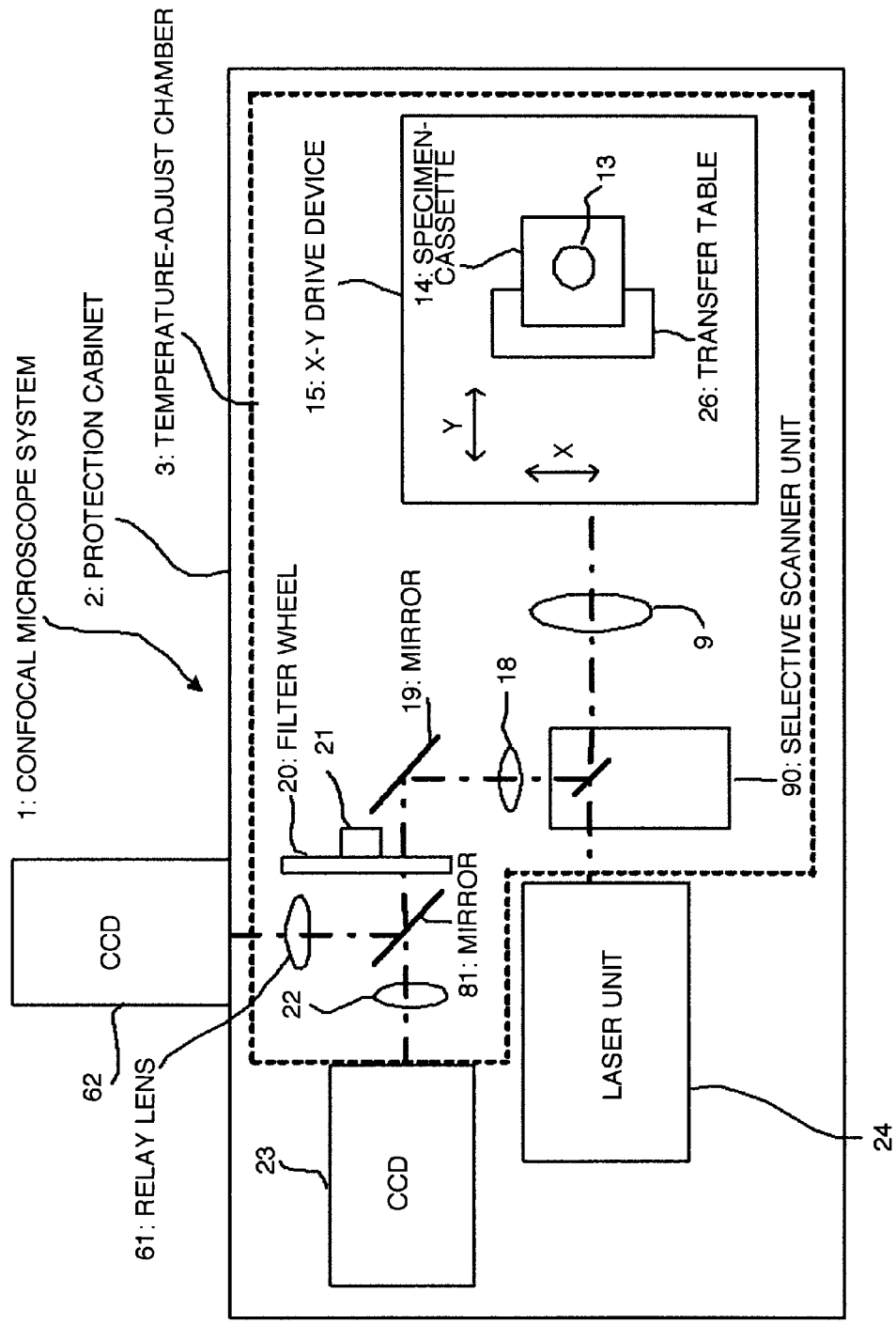

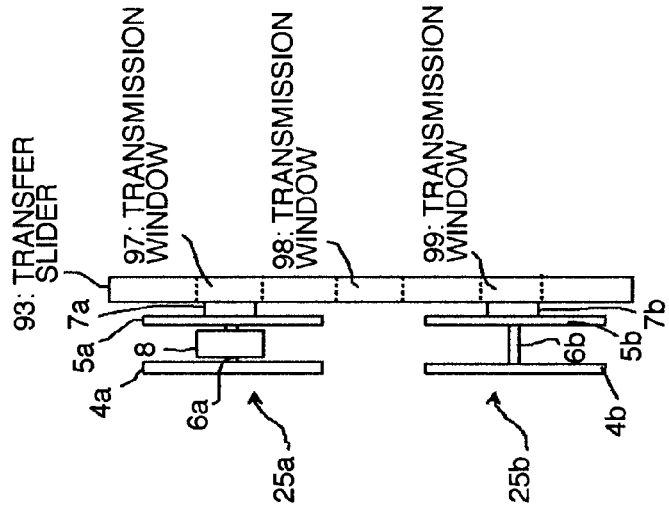
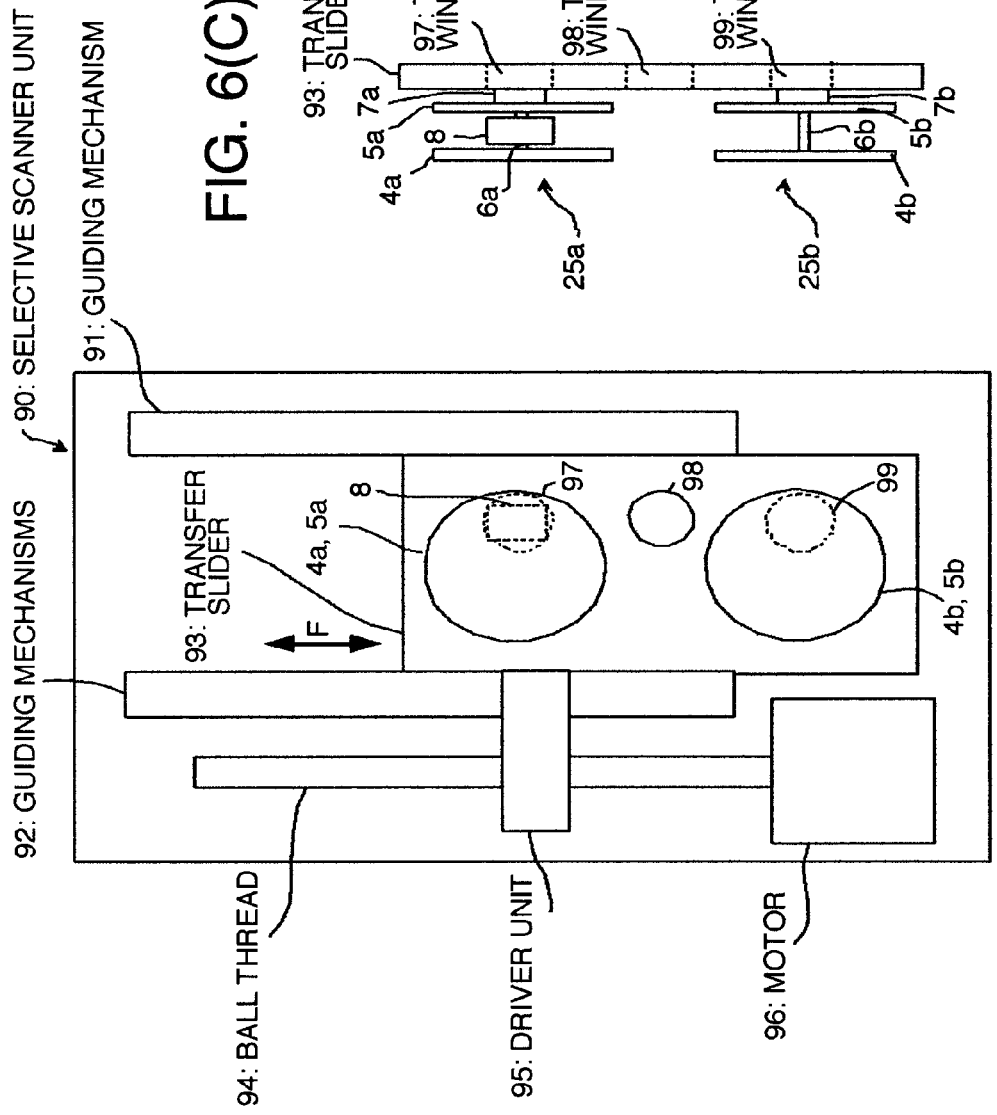

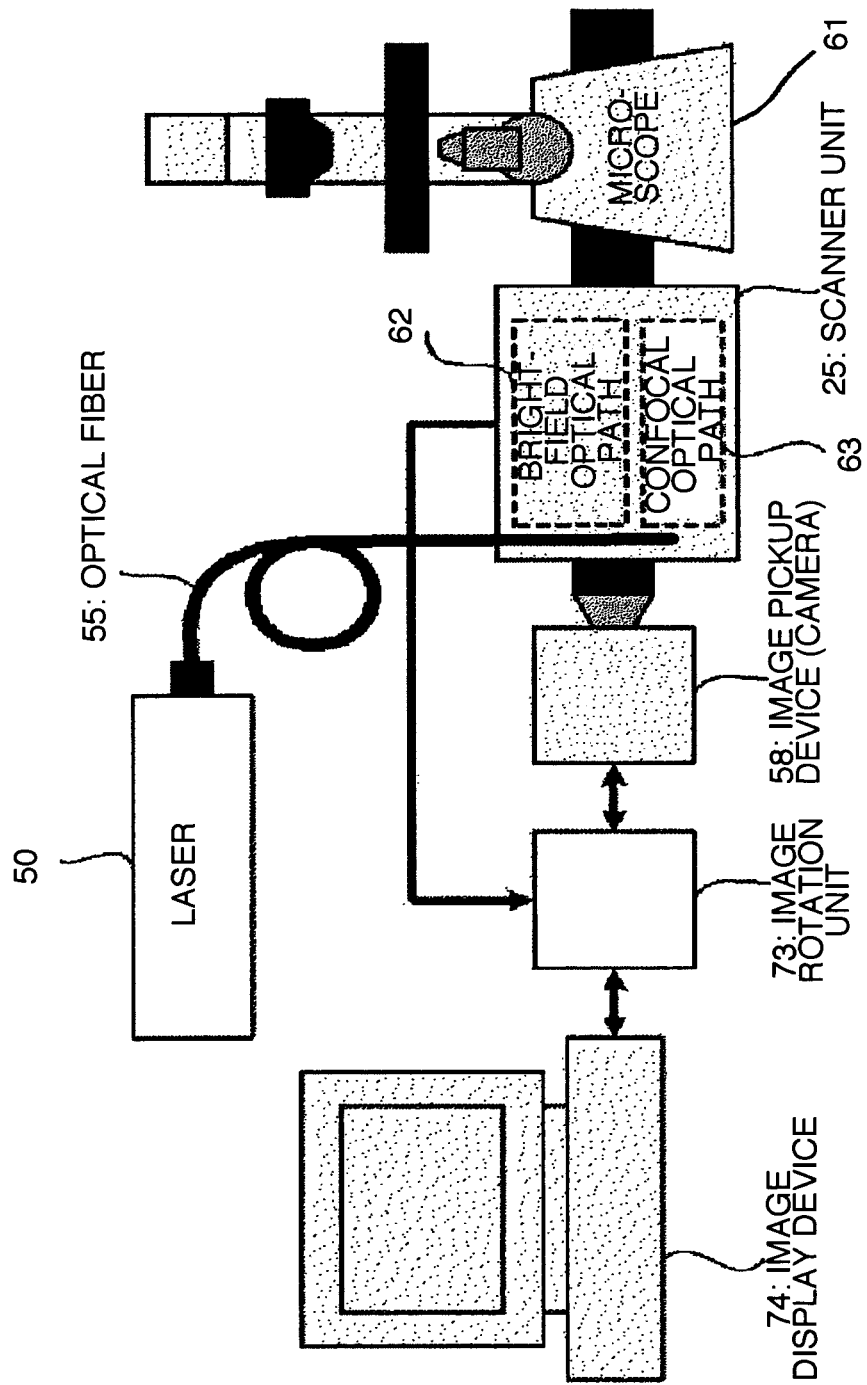

CONFOCAL MICROSCOPE SYSTEM

This application claims priority from Japanese Patent Application No. 2010-045102, filed on Mar. 2, 2010, the entire contents of which are herein incorporated by reference.

BACKGROUND

1. Technical Field

The invention relates to a confocal microscope system, and in particular, to a confocal microscope system wherein respective units making up the confocal microscope system are integrally combined together in an attempt to achieve improvements on installation space.

2. Related Art

With a confocal microscope system according to the present invention, the focal point of a laser beam, over a specimen, is scanned, and a returning florescent beam from the specimen is caused to form an image to obtain an image of the specimen, thereby carrying out observation on the specimen. Thus, the confocal microscope system is in use for making an observation on morphological observation as well as physiological response of a living cell, in the fields of a living organism, biotechnology, and so froth, or for making an observation on the surface of an LSI, and so forth, in the semiconductor market.

First, brief explanation is given about a confocal microscope system.

FIG. 7 is a functional block diagram of a related-art confocal microscope system, showing a configuration example thereof.

A light source unit 50 is made up of a plurality of multi-wavelength light sources 51a, 51b, 51c, a switching unit 54 for controlling transmission, and blocking of respective laser beams from the light sources, and filters 52a, 52b, 52c, differing from each other in respect of a light-transmission band.

The respective laser beams that have passed through the switching unit 54 are transmitted through the filters 52a, 52b, 52c, respectively, to fall on an end of an optical fiber 55 to subsequently outgo from the other end of the optical fiber 55 before falling on a mirror 56. The respective laser beams reflected from the mirror 56 fall on a scanner unit 25 comprised of a collimator lens 57, a micro-lens array disk 52, a pinhole disk 53, an objective lens 55, and so forth.

A photodetector 70 is comprised of dichroic mirrors 72a, 72b, 72c, barrier filters 75a, 75b, 75c, lenses 64a, 64b, 64c, and image pickup cameras 58a, 58b, 58c, the photodetector 70 receiving florescent beams emitted from a specimen 66.

The barrier filters 75a, 75b, 75c are comprised of a plurality of filters differing in transmission wavelength characteristic from each other. Respective output laser beams that are transmitted through the barrier filters 75a, 75b, 75c are condensed by the lenses 64a, 64b, 64c, respectively, before falling on the image pickup cameras 58a, 58b, 58c, respectively. The image pickup cameras 58a, 58b, 58c each amplifies an image as picked up to be converted into an electric signal before outputting the same.

An image acquisition device 80 converts the respective electric signals outputted from the image pickup cameras 58a, 58b, 58c, respectively, into image data blocks to be subsequently stored. An image display device 74 normally makes use of a computer to read the image data blocks that are stored in the image acquisition device 80, thereby applying processing thereto as appropriate before displaying an image on a display screen.

FIG. 8 is a schematic representation of the confocal microscope system described as above, showing a common layout of the system by way of example. The scanner unit 25 is attached to an observation-connection port of a microscope 61, and inside the scanner unit 25, there are provided optical paths of two systems, comprising a bright-field optical path 62, and a confocal optical path 63. The light source unit 50 is a pumping source. The optical fiber 55 guides an excitation beam from the light source unit 50 into the scanner unit 25. The image pickup device (camera) 58 is comprised of a CCD camera and so forth, detecting any of florescent images of a specimen, outgoing from the respective optical paths of the two systems of the scanner unit 25, including the bright-field optical path 62, and the confocal optical path 63. The image display device 74 is comprised of a PC, software, a board, and so forth, fetching image data blocks from the imaging device 58. An image rotation unit 73, and the image display device 74 display the florescent images of the specimen on the basis of the image data blocks as fetched

[Patent Document 1] JP 2004-212434 A
[Patent Document 2] JP 2009-205083 A

The related-art confocal microscope system described as above is made by combining a plurality of constituent elements together. The scanner unit, in particular, is often connected to a side-port of a microscope, in which case, a problem has arisen in that the system as a whole has increased in breadth, requiring a large space.

Furthermore, there has existed another problem that even after accurate positional adjustment is once made on a laser beam to be guided to an optical fiber, and the laser beam is further guided to the scanner unit again, it has been necessary to make accurate adjustment on the angle as well as the position of the laser beam, thereby causing much inconvenience.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

It is one of illustrative aspects of the present invention to provide a confocal microscope system configured so as to be compact in size without the needs for a large space, requiring fewer spots for adjustment.

According to one or more illustrative aspects of the invention, there is provided the confocal microscope system comprising a laser unit comprising at least not less than one unit of laser oscillator, a Nipkow disk type scanner unit for scanning with a laser beam from the laser unit, a projection optical system for projecting the laser beam for scanning scanned by the Nipkow disk type scanner unit, an X-Y drive device driving a specimen disposed opposite to an objective lens in X-Y directions on a table, a separation optical system for separating a portion of a fluorescent beam from the specimen, having passed through the scanner unit again, an imaging optical system for causing the portion of the fluorescent beam to form an image again, and an image capture unit disposed on an imaging plane of the imaging optical system, wherein respective units making up the confocal microscope system are integrally housed in a protection cabinet covering the confocal microscope system, and when the specimen is moved toward an external face of the protection cabinet, a side of the external face, adjacent to an opening through which the specimen is taken in, or out, is defined as a front face, the Nipkow disk type scanner unit is disposed backward of the objective lens.

BRIEF DESCRIPTION OF THE DRAWINGS

FIGS. 1(A), 1(B) each show one embodiment of a confocal microscope system according to the invention, in which FIG. 1(A) is a plan view thereof, and FIG. 1(B) is a front view thereof

FIGS. 3(A) to 3(C) each show an optical-axis adjust unit of the confocal microscope system, in detail, in which FIG. 3(A) is a front view thereof, FIG. 3(B) is a plan view thereof, and FIG. 3(C) is a right-side view thereof;

FIGS. 6(A) to 6(C) each are a view showing another embodiment of a confocal microscope system according to the invention, in which FIG. 6(A) is a plan view thereof, FIG. 6(B) is a front view of a scanner unit thereof, and FIG. 6(C) is a side view of the scanner unit;

FIG. 8 is a schematic representation of the related-art confocal microscope system, showing a common layout of the system.

DETAILED DESCRIPTION OF EXEMPLARY EMBODIMENTS

The present invention is described in detail hereinafter with reference to the accompanying drawings.

Figure 1A:
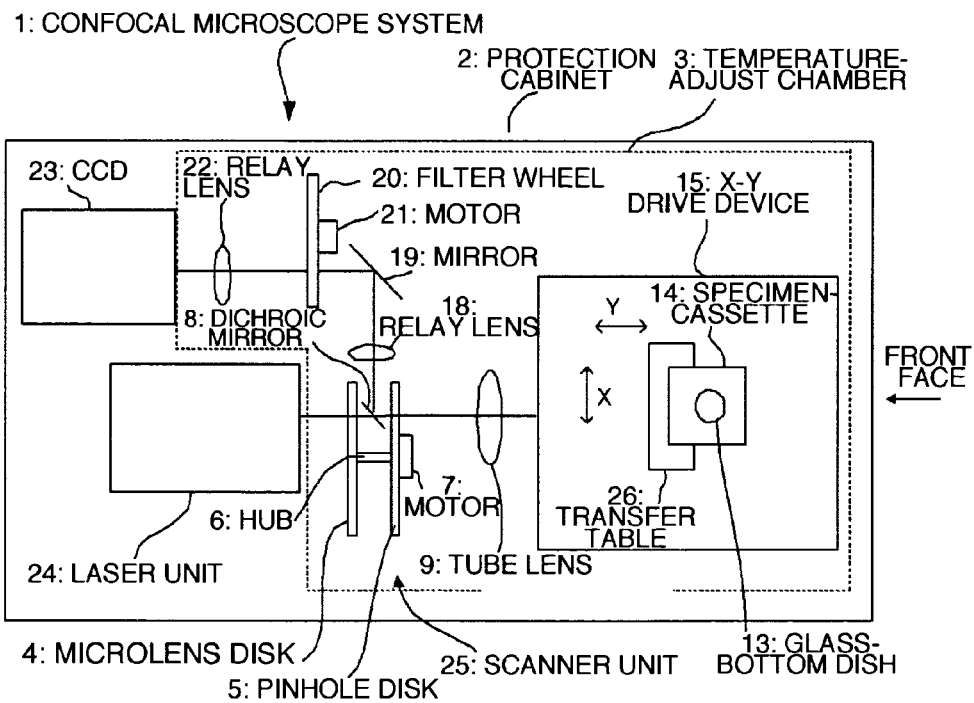
Figure 1B:
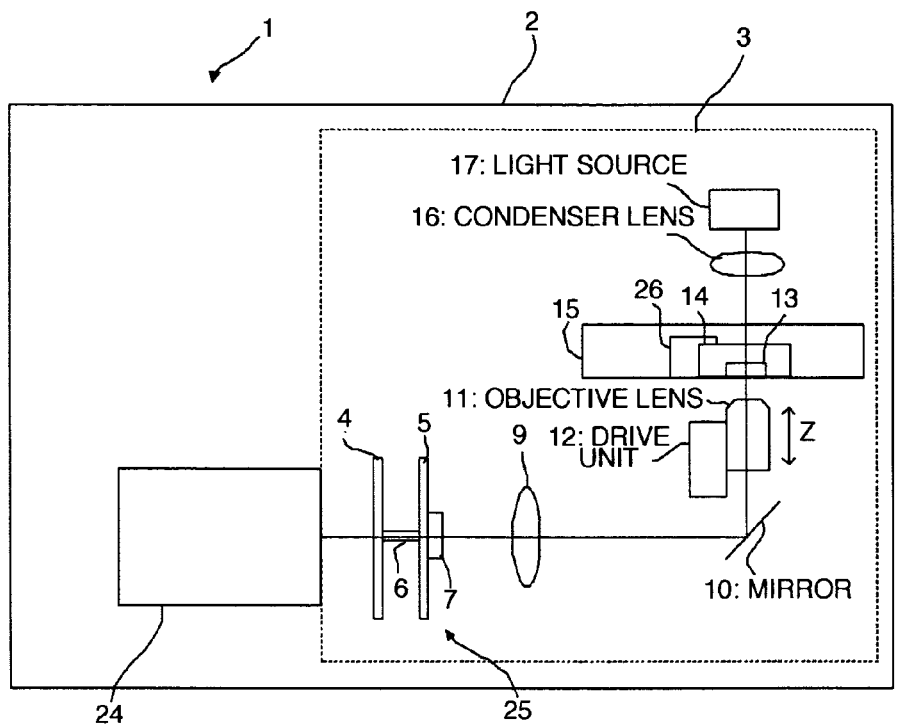

FIGS. 1(A), 1(B) each show one embodiment of a confocal microscope system according to the invention, in which FIG. 1(A) is a plan view thereof, and FIG. 1(B) is a front view thereof.

In FIGS. 1(A), 1(B), the confocal microscope system 1 is covered with a protection cabinet 2. A temperature-adjust chamber 3 is installed in the protection cabinet 2, the temperature-adjust chamber 3 being for use in adjusting an internal temperature thereof so as to be kept at a constant temperature (for example, at 30° C.). A face of the protection cabinet 2, on an observer's right side, is a front face, and the temperature-adjust chamber 3 is disposed such that the right side face thereof lies along the front face of the protection cabinet 2.

An X-Y drive device 15 is disposed on a side of the temperature-adjust chamber 3, adjacent to the front face of the protection cabinet 2, inside the temperature-adjust chamber 3, and a transfer table 26 that can be driven in X-Y directions is provided on the X-Y drive device 15. A specimen-cassette 14 having a glass-bottom dish 13 in which a specimen is housed is mounted on the transfer table 26, and the specimen-cassette 14 is moved in the X-Y directions, respectively, on the X-Y drive device 15, following the movement of the transfer table 26.

A condenser lens 16, and a light source 17 are disposed above the specimen-cassette 14 so as to oppose thereto, and an objective lens 11 is disposed below the specimen-cassette 14 so as to oppose thereto. A drive unit 12 drives the objective lens 11 in a Z-direction indicated by an arrow "Z" in FIG. 1(B).

Disposed backward of the X-Y drive device 15 is a scanner unit 25 comprising a microlens disk 4, and a pinhole disk 5, being linked with each other through the intermediary of a hub 6, so as to be rotatable by the action of a motor 7. A mirror 10 is disposed below the objective lens 11, and a tube lens 9 is disposed between the mirror 10, and the scanner unit 25. Further, a dichroic mirror 8 is disposed between the microlens disk 4 and the pinhole disk 5.

As seen in the front view, a mirror 19 is disposed backward of the scanner unit 25, through the intermediary of a relay lens 18, and a filter wheel 20 rotatable by a motor 21 is disposed on the left-hand side of the mirror 19. A CCD 23, and a laser unit 24 are disposed backward of the temperature-adjust chamber 3, as seen from the front face thereof, and outside the temperature-adjust chamber 3, a relay lens 22 being disposed between the CCD 23, and the filter wheel 20. The relay lens 22 is disposed inside the temperature-adjust chamber 3. The laser unit 24 is disposed backward of the temperature-adjust chamber 3, as seen from the front face thereof, in such a way as to oppose the scanner unit 25.

In FIGS. 1(A), 1(B), a portion of the system, comprising the tube lens 9, the mirror 10, and the objective lens 11, is referred to as a spot-lighting optical system, the dichroic mirror 8 is referred to as a separation optical system, a portion of the system, comprising the relay lenses 18, 22, the mirror 19, and the filter wheel 20, is referred to as an imaging optical system, and the CCD 23 is referred to as an image pickup device.

Figure 2:
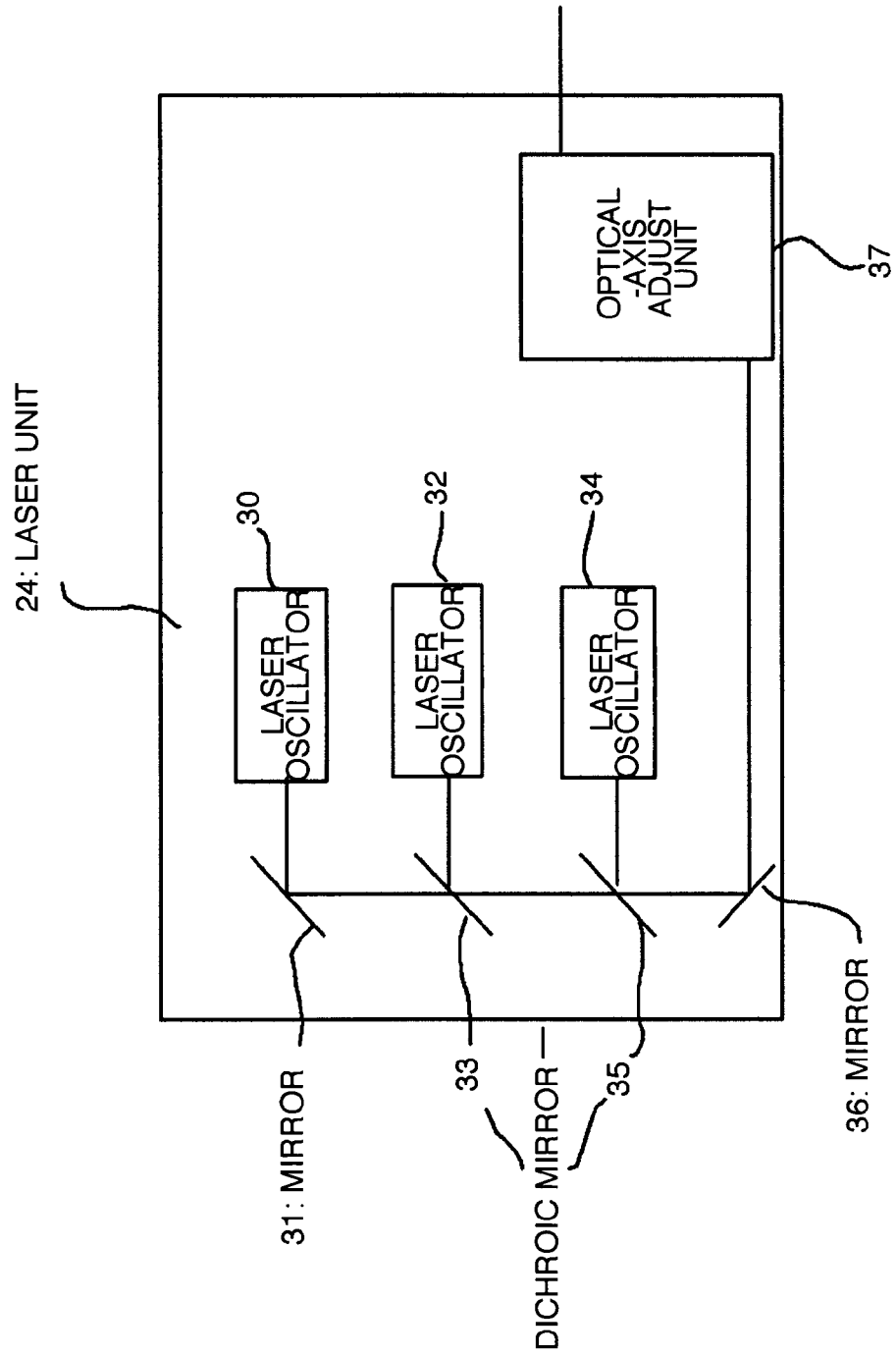
FIG. 2 is a front view showing a laser unit of the confocal microscope system, in detail.

FIG. 2 is a front view showing the laser unit 24 in detail. With the present embodiment, laser oscillators 30, 32, 34, capable of emitting three kinds of laser beams that differ in wavelength from each other, are disposed at a predetermined interval in space, in a vertical direction, inside the laser unit 24, so as to be arranged in parallel with each other, such that the respective laser beams adjusted so as to be turned into parallel beams are emitted in a horizontal direction. In this connection, those laser oscillators each may be either a semiconductor laser, or a solid-state laser.

A mirror 31 is disposed forward of the laser oscillator 30, a dichroic mirror 33 for reflecting a wavelength of the laser beam emitted from the laser oscillator 32, while transmitting a wavelength of the laser beam emitted from the laser oscillator 30, is disposed forward of the laser oscillator 32. Further, a dichroic mirror 35 for reflecting a wavelength of the laser beam emitted from the laser oscillator 34, while transmitting the respective wavelengths of the laser beams emitted from the laser oscillators 30, 32, is disposed forward of the laser oscillator 34, so that the three kinds of the laser beams emitted from the laser oscillators 30, 32, 34, respectively, are adjusted so as to have an identical optical axis. Further, a mirror 36 inclined at approximately 90 degrees is disposed at a forward position in an optical path, and the laser beams each are reflected by the mirror 36 to be guided to an optical-axis adjust unit 37.

Figure 3B:
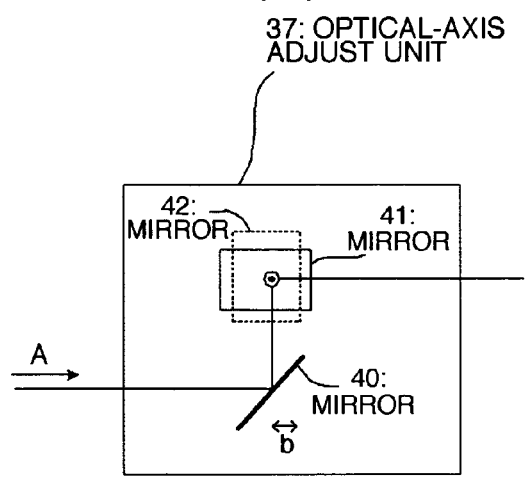
Figure 3A:
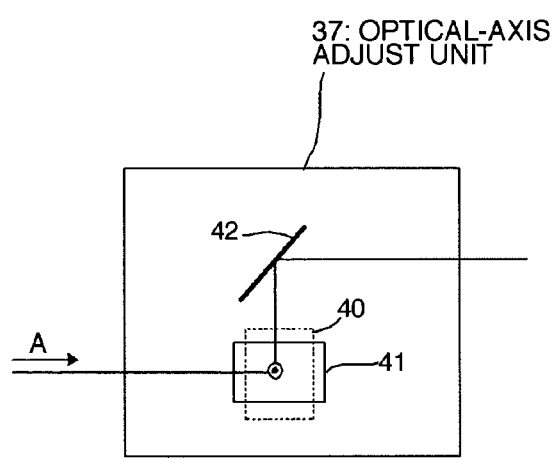
Figure 3C:
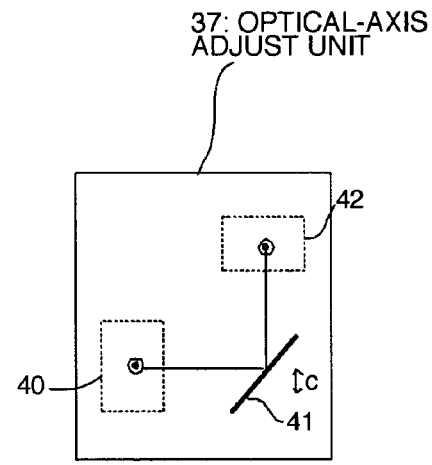

FIGS. 3(A) to 3(C) each show the optical-axis adjust unit 37 in detail, in which FIG. 3(A) is a front view thereof, FIG. 3(B) is a plan view thereof, and FIG. 3(C) a right-side view thereof. Disposed inside the optical-axis adjust unit 37 are three adjustable mirrors 40, 41, 42. A laser beam falling on the optical-axis adjust unit 37 from a direction indicated by an arrow A is reflected through substantially 90 degrees by the mirror 40, thereby travelling toward the mirror 41. The laser beam is again reflected substantially through 90 degrees by the mirror 41 to be again reflected substantially through 90 degrees by the mirror 42. Further, the mirror 40 is rendered adjustable along a direction indicated by an arrow "b", and the mirror 41 is rendered adjustable along a direction indicated by an arrow "c". Furthermore, the mirror 42 is rendered freely adjustable in respect of inclination thereof.

As a result of three reflections described as above, the orientation of the laser beam falling on the optical-axis adjust unit 37 will become substantially identical to the orientation of the laser beam outgoing therefrom. Further, a reflection position on the mirror 41 will be varied by adjusting the mirror 41 in the b-diretion, thereby enabling adjustment of a position of the laser beam outgoing from the optical-axis adjust unit 37, in the direction of height. Furthermore, if the mirror 42 is adjusted in the c-direction, this will enable a reflection position on the mirror 42 to be varied, thereby adjusting a position of the laser beam outgoing from the optical-axis adjust unit 37, in the transverse direction.

Still further, if the inclination of the mirror 42 is varied, this will enable adjustment of the orientation of the laser beam outgoing from the optical-axis adjust unit 37. Those mirrors each are independently adjustable, and are capable of adjusting the orientation as well as the position of the laser beam outgoing from the laser unit 24 with ease and precision.

Now, reverting to FIGS. 1(A), 1(B), the scanner unit 25 is disposed forward of the laser unit 24. With the scanner unit 25, the microlens disk 4, and the pinhole disk 5 are linked with each other through the intermediary of the hub 6, and are freely rotatable by the action of the a motor 7.

Figure 4:
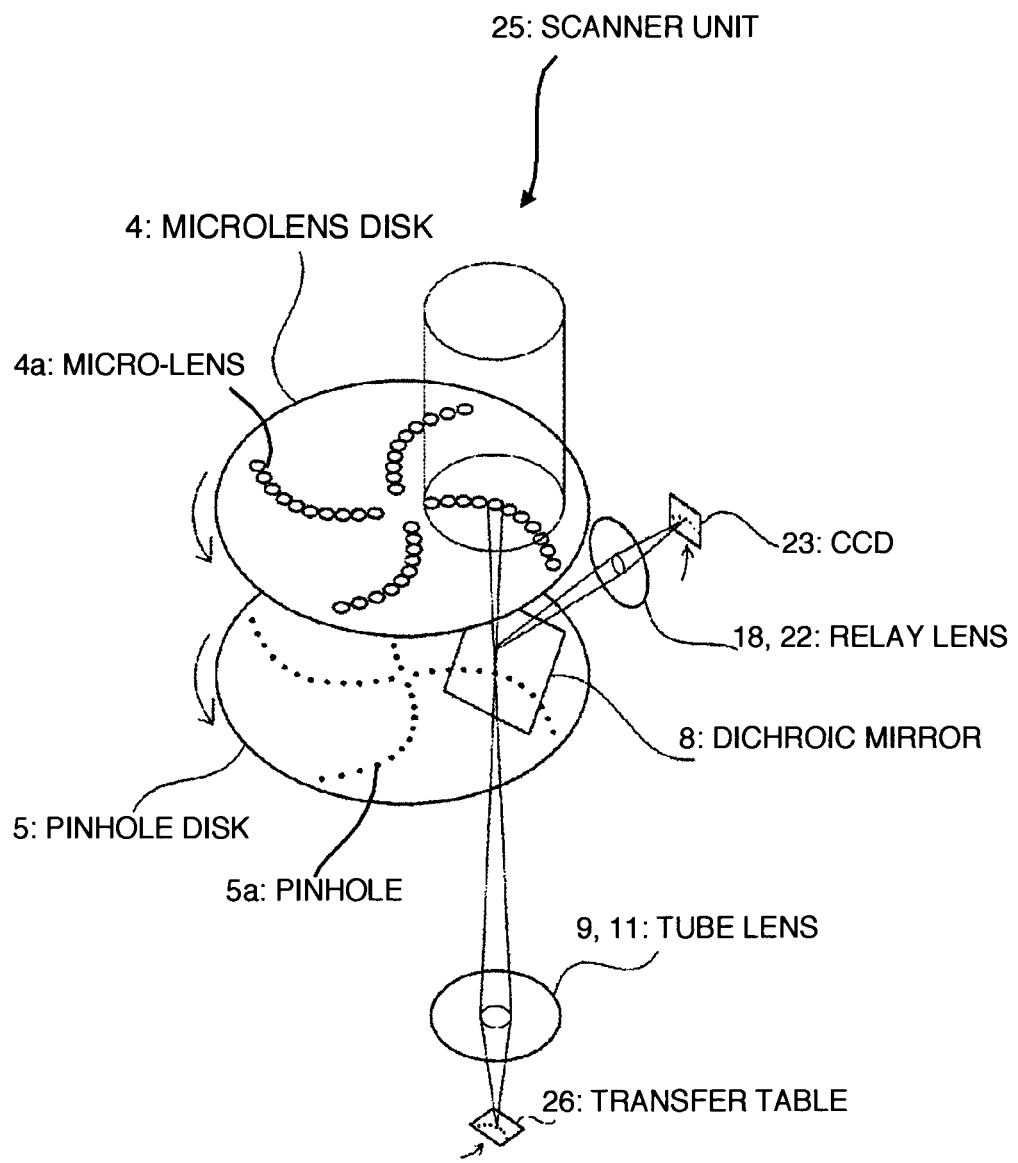
FIG. 4 is a perspective view showing a scanner unit of the confocal microscope system, in detail.

FIG. 4 is a perspective view showing the scanner unit 25 in detail. A multitude of microlenses 4a arranged in a spiral pattern are disposed on the microlens disk 4, and a multitude of pinholes 5a arranged in the same spiral pattern are disposed on the pinhole disk 5. As shown in FIG. 4, the scanner unit 25 is configured such that the spiral pattern of the microlenses 4a, and the spiral pattern of the pinholes 5a correspond to each other on the basis of 1:1, and the laser beams passing through the microlens disk 4 are each properly focused at a focal point on the pinhole disk 5 corresponding to the microlens disk 4.

The dichroic mirror 8 is secured by a fixed member (not shown) positioned between two sheets of disks, that is, the microlens disk 4, and the pinhole disk 5. For the dichroic mirror 8, use is made of a mirror capable of transmitting the laser beams outgoing from the laser unit 24, and reflecting a fluorescent beam contained in the respective laser beams. Further, for the dichroic mirror 8, selection is made of the mirror capable of also reflecting a wavelength for transmission illumination that will be described later in the present description.

As described in the foregoing, each of the laser beams that have passed through the microlens disk 4 is condensed on a corresponding pinhole of the pinhole disk 5, and each of the laser beams, having passed through the pinhole, is focused at a focal point on the objective lens 11, corresponding to the pinhole, by the respective actions of the tube lens 9, and the objective lens 11. In FIG. 4, the respective actions of the two lenses are combined together so as to be schematically shown as the action of one lens.

The fluorescent beam from the focal point retraces the same optical path as the laser beam has passed to subsequently pass through the same pinhole again to be reflected by the dichroic mirror 8 before being formed into an image on the CCD 23 high in sensitivity by the respective actions of the relay lenses 18, 22. Herein, the respective operations of the two relay lenses 18, 22 are also schematically shown as an operation of one lens. The microlens disk 4 and the pinhole disk 5 are integrally rotated by the action of the motor 7 at this point in time, whereupon the focal point corresponding to the fluorescent beam is caused to move, thereby further moving the fluorescent beam that have formed the image on the CCD 23 high in sensitivity.

Thus, the respective focal points of the plurality of the laser beams scan over the specimen at a high speed, and the respective fluorescent beams from the specimen form the image on the CCD 23. In this case, since the fluorescent beam in the respective laser beams that have deviated from a focal plane will not pass through the same optical paths as the laser beam has passed through, the fluorescent beam will hardly fall on the pinhole corresponding thereto. Accordingly, the image observed on the CCD 23 will be a confocal image in very close proximity to the focal plane.

Further, by driving the Z-drive unit 12 with the use of a controller (not shown), it is possible to bring the focal point to an optimum position on the specimen, and to pick up respective tomograms at various depths. Still further, a desired position on the glass-bottom dish 13 can be observed by the action of the X-Y drive device 15.

Furthermore, if the controller executes selective changeover among the laser oscillators 30, 32, 34, inside the laser unit 24, selecting an optimum filter in the filter wheel, this will enable fluorescent images at a plurality of wavelengths to be obtained. Further, if transmissive illumination is executed by lighting up the light source 17 for use in transmissive observation, without causing the oscillation of the laser beam, this will enable a transmission image passing through the same optical path as the fluorescent beam has passed to be observed.

As shown in FIGS. 1(A), 1(B), the tube lens 9 is disposed forward of the scanner unit 25, and the mirror 10 is disposed ahead of the tube lens 9, so that the laser beam is bent upward. The objective lens 11 is disposed above the mirror 10 so as to be movable in the Z-direction by the action of the Z-drive unit 12. The X-Y drive device 15 is disposed above the objective lens 11. The transfer table 26 is mounted on the X-Y drive device 15, and the specimen-cassette 14 is removably mounted on the transfer table 26.

The specimen, the glass-bottom dish 13, and so forth are mounted inside the specimen-cassette 14. Further, upon placement of the specimen-cassette 14, necessary water, carbon dioxide, and so forth are fed thereto such that the interior of the specimen-cassette will be in an environment optimal for cell culture to be maintained at an optimal temperature. Further, disposed above the specimen are the light source 17 for transmissive illumination when making the transmissive observation, and the condenser lens 16 (refer to FIG. 1(B)).

The fluorescent beam emitted from the specimen due to radiation of the laser beam is transmitted through the objective lens 11 to be reflected by the mirror 10 before being condensed on the pinhole disk 5 by the action of the tube lens 9 to be guided to the dichroic mirror 8.

Then, the fluorescent beam emitted from the specimen, and a transmitted beam due to the transmissive illumination are reflected by the dichroic mirror 8 to be guided to the relay lens 18. A light beam transmitted through the relay lens 18 is reflected by the mirror 19 before passing through the filter wheel 20.

A plurality of filters (not shown) are mounted in the filter wheel 20, and by rotating the filter wheel 20 by the action of the motor 21, any of the filters can be selectively chosen. The light beam passing through the filter wheel 20 is guided to the CCD 23 high in sensitivity after passing through the relay lens 22. The system is configured such that an image on a pinhole disk plane is projected on the plane of the CCD 23 by the respective actions of the two relay lenses 18, 22. The CCD 23, and the laser unit 24 previously described are disposed outside of the temperature-adjust chamber 3.

Figure 5:
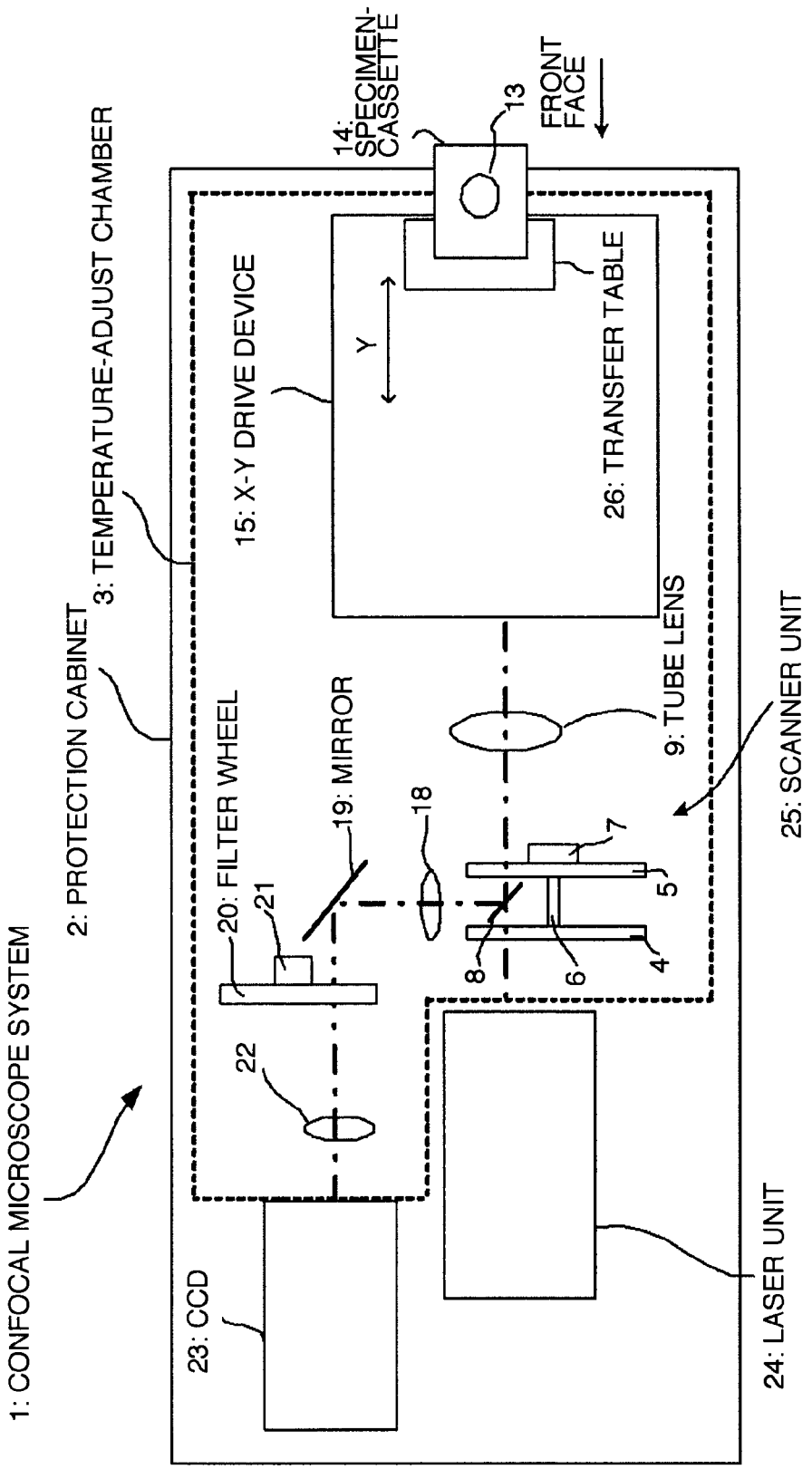
FIG. 5 is a plan view of the confocal microscope system, showing a state in which a specimen-cassette has been moved toward the front face of a protection cabinet.
Figure 7:
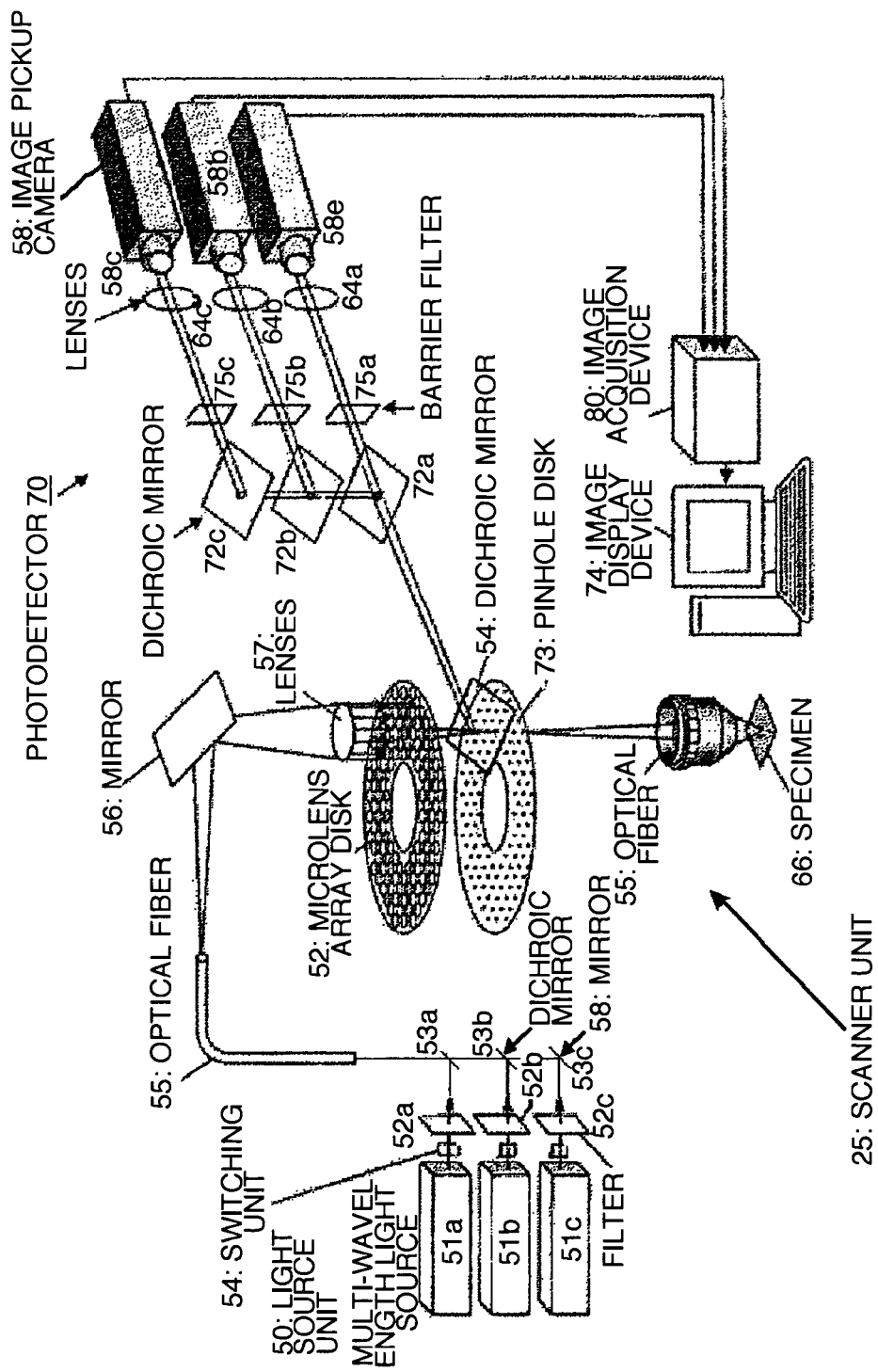
FIG. 7 is a functional block diagram of a related-art confocal microscope system, showing a configuration example thereof.

FIG. 5 is a plan view of the confocal microscope system, showing a state in which the specimen-cassette 14 has been moved toward the front face of the protection cabinet 2 when setting up a specimen. The system is configured such that the specimen-cassette 14 is exposed from respective openings of the protection cabinet 2, and the temperature-adjust chamber 3 by bringing the transfer table 26 to a predetermined position in the Y-direction. With the system kept in this state, the specimen-cassette 14 is taken out, the glass-bottom dish 13 containing the specimen is set in the specimen-cassette 14 to be subsequently fitted thereto again, and the glass-bottom dish 13 is transferred to a predetermined position inside the temperature-adjust chamber 3.

As shown in FIG. 2, the laser oscillators 30, 32, 34 emitting the three kinds of the laser beams differing in wavelength from each other, respectively, are disposed in the laser unit 24, and the respective outputs of those laser oscillators are controlled ON/OFF as necessary by a controller (not shown). The three kinds of the laser beams each are collimated to be adjusted so as to turn coaxial with each other by the respective actions of a mirror 31, and dichroic mirrors 33, 35. The three kinds of the laser beams are guided to the optical-axis adjust unit 37 by the action of the mirror 36.

The laser beams from the laser unit 24 are caused to fall on the scanner unit 25. The laser beams each are condensed by each of the microlenses on the microlens disk 4 to pass through the dichroic mirror 8 before being converged at a focal point on a corresponding pinhole on the pinhole disk 5. In this case, in order to accurately bring the focal point onto the pinhole, it is necessary to accurately adjust an inclination as well as a position of the laser beam, and for that purpose, the optical-axis adjust unit described as above will effectively act. The laser beam passing through the pinhole disk 5 is turned into parallel rays having an inclination corresponding to a position of the pinhole by the action of the tube lens 9 disposed frontward.

The parallel rays each are bent upward by the action of the mirror 10 to be converged on a focal point by the action of the objective lens 11. If a fluorescent stained specimen is present at the position of the focal point, a portion of a fluorescent beam from the specimen falls on the objective lens 11 again to retrace the same optical path as the laser beam has passed, being guided to the tube lens 9 by the action of the mirror 10, before being converged at a focal point on the respective pinholes 5*a* again by the action of the tube lens 9.

Herein, light beams passing through the pinhole 5*a* are reflected by the dichroic mirror 8 to pass through the relay lens 18 to be again reflected by the mirror 19 before passing through the filter wheel 20 to be subsequently guided to the relay lens 22. At this point in time, the respective focal points of the light beams, on the pinhole, are transferred to respective corresponding positions on the CCD 23 high in sensitivity by the respective actions of the two relay lenses 18, 22. Further, if a controller (not shown) has chosen one laser beam among the laser beams in the laser unit, the controller chooses an optimum filter out of the filter wheel 20, the optimum filter being one for transmitting only a fluorescent beam corresponding to the wavelength of the one laser beam.

Further, with the present embodiment, there is shown an example wherein use is made of only one piece of the objective lens 11, however, there is no limitation thereto, and use may be made of a plurality of objective lenses. Still further, there is shown an example wherein use is made of the three mirrors for adjustment of the laser beam, however, there is no limitation thereto, and the adjustment may be made by use of two mirrors, and by varying orientation as well as a position of the laser unit 24, or by use of other methods.

Furthermore, the outer side of the temperature-adjust chamber 3 may be cooled, in which case the service life of each of the laser oscillators can be extended, and noise of the CCD high in sensitivity can be reduced.

FIGS. 6(A) to 6(C) each are a view showing another embodiment of a confocal microscope system according to the invention. In the figures, elements identical to those in FIG. 1 are denoted by like reference numerals, respectively, thereby omitting description thereof.

The confocal microscope system, shown in a plan view of FIG. 6(A), differs from the confocal microscope system shown in FIG. 1(A) in that a selective scanner unit 90, and a CCD high in sensitivity are additionally mounted therein. A mirror 81 is disposed backward of a filter wheel 20 positioned halfway through an optical path for use in observation of the fluorescent beam. The mirror 81 is freely insertable in the optical path by the action of an actuator (not shown). The system is configured such that a second CCD 62 high in sensitivity is removably disposed in the direction of an optical axis that is bent by the mirror 81 with a relay lens 61 interposed therebetween, and the fluorescent beam forms an image on the CCD 62.

FIG. 6(B) is a front view of the selective scanner unit 90 (a view as seen from the optical axis thereof). In this case, use is made of the selective scanner unit 90 capable of making a selection among a plurality of scanners in place of the scanner unit 25 shown in FIG. 1. FIG. 6(C) is a side view showing a disk portion thereof, as seen from a side face thereof.

With the present invention, use is made of two scanners 25*a*, 25*b*. With the scanner 25*a*, a microlens disk 4*a* is linked with a pinhole disk 5*a*, through the intermediary of a hub 6*a*, as is the case with the scanner unit shown in FIG. 1, both the microlens disk 4*a* and the pinhole disk 5*a* being freely rotatable by the action of a motor 7*a*. Similarly, with the scanner 25*b*, a microlens disk 4*b* is linked with a pinhole disk 5*b*, through the intermediary of a hub 6*b*, both the microlens disk 4*b* and the pinhole disk 5*b* being freely rotatable by the action of a motor 7*b*.

With the respective scanners, there are provided microlenses arranged in a spiral pattern, and pinholes arranged in the spiral pattern, as is the case with the scanner unit shown in FIG. 4. Further, the pinhole disk 5*a* differs from the pinhole disk 5*b* in respect of the diameter of the pinhole in use, and for the pinhole disk 5*b*, use is made of, for example, a pinhole smaller in diameter than the pinhole of the pinhole disk 5*a*. Those two scanners 25*a*, 25*b* are mounted on a transfer slider 93.

In addition to transmission windows 97, 99, provided at respective spots on the transfer slider 93, for transmitting a light beam therethrough, there is also provided a transmission window 98 between the two scanners. The transfer slider 93 is supported by two guiding mechanisms 91, 92 in such a way as to be movable in the direction of an arrow F in FIG. 6(B). Further, a driver unit 95 incorporating a ball nut (not shown) is linked with the transfer slider 93, and a ball thread 94 linked with a motor 96 is engaged with the ball nut of the driver unit 95, so that there is set up a configuration wherein the transfer slider 93 is movable in the direction of the arrow F by rotating the motor 96. Further, a dichroic mirror 8 is fixed on the optical axis, as is the case of the embodiment shown in FIG. 1.

With the adoption of the configuration described as above, the scanner for use can be selected by the selective scanner unit 90. In FIG. 6(B), there is shown the case where the scanner 25*a* is disposed on the optical axis, however, in the case of the pinhole smaller in diameter being preferable, such as, for example, in the case of the objective lens having a low magnification, the transfer slider 93 can be moved upward by rotating the motor 96, thereby causing the scanner 25b to be brought onto the optical axis.

Thus, an optimal pinhole diameter can be selected according to power of the objective lens for use in observation. Furthermore, it is possible to position the transmission window 98 on the optical axis, in which case, a transmission image brighter than the transmission image obtained in the case of the embodiment shown in FIG. 1 can be obtained by adoption of transmissive illumination.

Further, a camera to be put to use can be selectively adopted by insertion/removal of the mirror 81. If, for the second CCD 62, use is made of, for example, a camera higher in precision than a first CCD 23 high in sensitivity, this will enable the camera to be properly used as necessary. Furthermore, for the mirror 81, use may be made of a dichroic mirror.

In this case, if selection is made of, for example, filters of the filter wheel 20, and the dichroic mirror 8, corresponding to a plurality of wavelengths, and use is made of two laser beams in a laser unit 24, corresponding to those wavelengths, respectively, thereby executing concurrent excitation at two wavelengths, and using a dichroic mirror as the mirror 81, this will make it possible to concurrently observe respective fluorescent beams due to the laser beams differing in wavelength from each other by separating the fluorescent beams at the respective wavelengths from each other. Further, the CCD 62 high in sensitivity can be easily fitted or removed as necessary.

Furthermore, a pinhole corresponding to an objective lens 11 can be selected, and with the use of the transmission window 98 between the two scanners, a brighter transmission image can be obtained while concurrent observation can be made by the excitation at the two wavelengths.

As is evident from the description given in the foregoing, since the laser unit, and the image capture unit are disposed backward of the external face of the protection cabinet, adjacent to the opening, the protection cabinet can be reduced in breadth, thereby improving space utilization.

Since the either one of the Nipkow disk type scanner units is selectively usable, it is possible to adopt the scanner having pinholes optimal in diameter.

Since the laser unit, and the image capture unit are disposed outside of the temperature-adjust chamber, thereby lessening performance degradation caused by heat and reducing noise caused by heat.

Since a laser beam emission part of the laser unit is provided with the optical-axis adjust unit, the laser beam falling on the scanner unit can be adjusted with ease.

Further, it is to be pointed out that the description of the present invention, given as above, merely indicates specific and preferable embodiments by way of example. For example, in FIG. 6(A), there is shown the embodiment wherein both the selective scanner unit 90, and the CCD high in sensitivity are additionally mounted, however, there is no limitation thereto, and either one thereof may be added.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A confocal microscope system comprising:
   a laser unit comprising at least one unit of laser oscillator;
   a Nipkow disk type scanner unit for scanning with a laser beam from the laser unit;
   a projection optical system for projecting the laser beam for scanning by the Nipkow disk type scanner unit;
   an X-Y drive device for driving a specimen disposed opposite to an objective lens in X-Y directions on a table;
   a separation optical system for separating a portion of a fluorescent beam from the specimen, having passed through the scanner unit again;
   an imaging optical system for causing the portion of the fluorescent beam to form an image again;
   an image capture unit disposed on an imaging plane of the imaging optical system; and
   an optical-axis adjust unit capable of adjusting the axis of the laser beam outgoing from the laser unit in relation to the Nipkow disk type scanner unit,
   wherein respective units making up the confocal microscope system are integrally housed in a protection cabinet covering the confocal microscope system,
   wherein when the specimen is moved toward an external face of the protection cabinet, a side of the external face, adjacent to an opening through which the specimen is taken in or out, is defined as a front face,
   wherein the Nipkow disk type scanner unit is disposed backward of the objective lens, and
   wherein the optical-axis adjust unit is disposed within the laser unit, and
   wherein the optical-axis adjust unit comprises a plurality of adjustable mirrors, each mirror being independently adjustable to adjust orientation and position of the laser beam outgoing from the laser unit.

2. The confocal microscope system according to claim 1, wherein the laser unit, and the image capture unit are disposed backward of the Nipkow disk type scanner unit.

3. The confocal microscope system according to claim 1, wherein the axis of the laser beam outgoing from the laser unit is oriented so as to be substantially parallel with the optical axis of the image capture unit.

4. The confocal microscope system according to claim 1, wherein the objective lens has an optical axis oriented in a vertical direction, and the Nipkow disk type scanner unit has an optical axis oriented in a horizontal direction, thereby reflecting respective optical signals in a direction orthogonal to the optical axis through the intermediary of reflecting members.

5. The confocal microscope system according to claim 1, wherein a plurality of the Nipkow disk type scanner units differing from each other in respect of each pinhole diameter are disposed inside the protection cabinet such that either one of the scanners is selectively usable.

6. The confocal microscope system according to claim 1, wherein the Nipkow disk type scanner unit, and the imaging optical system are disposed inside a temperature-adjust chamber while the laser unit, and the image capture unit are disposed outside of the temperature-adjust chamber.

* * * * *